Oct. 6, 1959  C. J. VELARE ET AL  2,907,568
PORTABLE FERRIS WHEEL
Filed Nov. 19, 1956

INVENTORS.
CURTIS J. VELARE,
ELMER C. VELARE,
BY
ATTORNEY.

2,907,568
PORTABLE FERRIS WHEEL

Curtis J. Velare and Elmer C. Velare, Long Beach, Calif.

Application November 19, 1956, Serial No. 623,018

2 Claims. (Cl. 272—29)

This invention relates to a portable Ferris wheel, and preferably a dual wheel, in which the wheels are mounted on trailers so that the Ferris wheels may be moved from place to place as desired.

An object of our invention is to provide a novel portable Ferris wheel in which the wheel is so mounted on adjacent trailers that the seats of the Ferris wheel descend to a point below the bed of the trailers and adjacent the ground, so that the seats may be loaded from the ground or from a small platform resting on the ground.

Another object of our invention is to provide a novel portable dual type Ferris wheel in which the supporting columns for the wheel are mounted upon the beds of adjacent trailers, the Ferris wheel rotating in a plane between the beds of the trailers when in operation.

Another object of our invention is to provide a novel portable Ferris wheel construction which permits movement of the Ferris wheel from place to place as desired, and is also rigid enough to safely support the Ferris wheel when in operation.

Other objects, advantages and features of invention may appear from the accompanying drawing, the subjoined detailed description and the appended claims.

Figure 1:
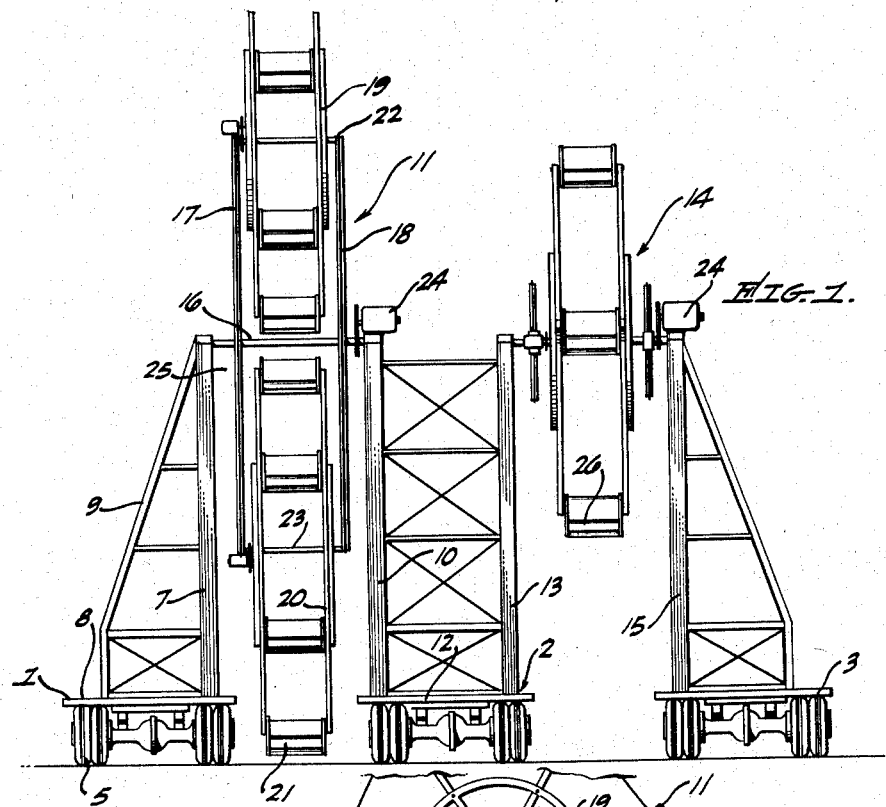
Figure 1 is an end view of our portable Ferris wheel.
Figure 2:
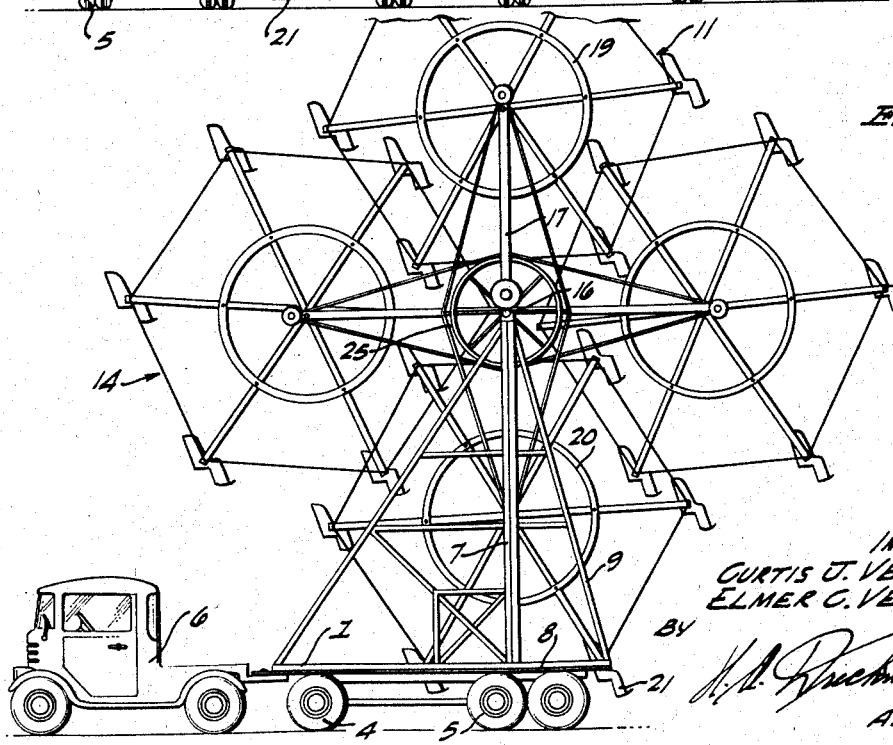
Figure 2 is a fragmentary side elevation of the same.

Referring more particularly to the drawing, our portable Ferris wheel is mounted upon the trailers 1 and 2, and in event that a second complete Ferris wheel is used adjacent the first one then a third trailer 3 is also employed. These trailers are of the flat bed type and are provided with appropriate wheels 4—5 at both the front and the rear so that the trailers may be moved on the highway behind the usual truck 6. A supporting column 7 is mounted on the flat bed 8 of the trailer 1 and the column 7 may be hinged or detachably connected to the bed 8 of the trailer so that the column may be lowered when moving along the highway. The column 7 is of the structural type and is provided with suitable supporting arms 9 so that the structure is rigid when erected. The second trailer 2 is also provided with a column 10 which is spaced from the column 7 a suitable distance to accommodate the Ferris wheel structure 11 therebetween. The column 10 is similar in construction to the column 7 and is preferably arranged adjacent one side of the flat bed 12 of the trailer 2. The trailer 2 may be provided with a pair of vertical columns, that is, a second column 13 may be mounted thereon which is similar in construction to the column 10. The second column on the trailer 2 is used when a second Ferris wheel 14 is employed, this second Ferris wheel being rotatably mounted between the column 13 and another column 15 on the trailer 3. The columns 7, 10, 13 and 15 are all built up of structural shapes, and these columns are all either hingedly mounted or detachably secured to the trailers 1, 2 and 3 so that each of the columns may be lowered for the purpose of transporting the equipment along the highway. A shaft 16 is journaled on the upper ends of the columns 7 and 10 and this shaft extends horizontally between these columns. A pair of spaced boom arms 17—18 are attached to the shaft 16 and these boom arms extend outwardly from the shaft for the purpose of supporting the rotatable Ferris wheels 19 and 20. The Ferris wheels 19 and 20 are each provided with a plurality of hingedly mounted seats 21 arranged between the side structures of the Ferris wheels, and these seats accommodate passengers who are carried in the Ferris wheel in the usual and well known manner. The Ferris wheels 19 and 20 will move alternately to a position close to the ground level and between the trailers 1 and 2 so that the various seats 21 can be loaded directly from the ground. No raised platform or steps are necessary in order to load the Ferris wheel, which increases the safety to the passengers. The wheels 19 and 20 are each journaled on a shaft 22—23, respectively, and these shafts are journaled on the booms 17—18 in a usual and well known manner. The entire structure, that is, the boom arms 17—18, together with the wheels 19—20 are all rotated around the axis of the shaft 16 by means of an electric motor 24 which drives the bull wheel 25 attached to the boom 17. The wheels 19 and 20 are also independently rotated on the booms 17 and 18 by a means usual and well known in the art.

The second Ferris wheel assembly 14 is identical in construction to the Ferris wheel 11, previously described, and this second Ferris wheel assembly is mounted between the columns 13 and 15, and also is so positioned on these columns that it will rotate between the trailers 2 and 3 and the seats 26, of which also move to a point close to the ground level so that passengers may be loaded directly into the second Ferris wheel and from the ground, in the manner previously described for the wheel 11.

When it is desired to move the Ferris wheels from place to place the wheels themselves are disassembled. Thereafter the booms 7, 10, 13 and 15 are each lowered onto the bed of the trailers 1 or 2 or 3, after which trucks are hitched to the trailers and the entire structure may be moved along the highway to another assembly point.

Having described our invention, we claim:

1. A portable Ferris wheel comprising a first trailer, a bed on said trailer, a column rising from said bed, a second trailer, a bed on the second trailer, a column rising from the bed of the second trailer, said trailers being spaced horizontally, a shaft journaled on both of said columns, a Ferris wheel mounted on said shaft and positioned between the trailers, and seats on said Ferris wheel, said Ferris wheel being so positioned that the seats thereon move adjacent to the ground between said trailers in one position of the seats whereby the Ferris wheel may be loaded from ground level.

2. A portable Ferris wheel comprising a first trailer, a bed on the first trailer, a column rising from said bed, a second trailer, a bed on the second trailer, a column rising from the bed of the second trailer, said trailers being spaced horizontally, a shaft journaled on each of said columns, a Ferris wheel mounted on said shaft and positioned between the trailers, a central driving wheel on the Ferris wheel, an electric motor mounted on one of said columns, and drive means extending from the electric motor to the bull wheel to rotate the Ferris wheel, seats on the Ferris wheel, said Ferris wheel being positioned between the trailers so that the seats thereon move adjacent to the ground in one position of the seats whereby the Ferris wheel may be loaded from ground level.

References Cited in the file of this patent

UNITED STATES PATENTS

| | | |
|---|---|---|
| 1,262,687 | Miller | Apr. 16, 1918 |
| 1,397,938 | Unger et al. | Nov. 22, 1921 |
| 1,867,996 | Baer | July 19, 1932 |
| 2,249,076 | Courtney | July 15, 1941 |
| 2,590,934 | Catlett | Apr. 1, 1952 |